(12) United States Patent
Breen et al.

(10) Patent No.: US 7,231,848 B2
(45) Date of Patent: Jun. 19, 2007

(54) TRANSFER CASE WITH DUAL CHAIN TRANSFER MECHANISM

(75) Inventors: Timothy W. Breen, East Syracuse, NY (US); Randolph E. Beasock, Durhamville, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 57 days.

(21) Appl. No.: 10/875,923

(22) Filed: Jun. 24, 2004

(65) Prior Publication Data
US 2005/0284255 A1    Dec. 29, 2005

(51) Int. Cl.
*F16H 37/06*    (2006.01)
(52) U.S. Cl. .............. 74/665 GE; 74/665 F; 74/665 G; 74/665 R; 74/665 GA; 180/233; 180/247
(58) Field of Classification Search .......... 74/665 R, 74/665 F, 665 G, 665 GE, 665 GA; 180/233, 180/247; 475/204, 320
See application file for complete search history.

(56) References Cited

U.S. PATENT DOCUMENTS

| | | | | |
|---|---|---|---|---|
| 2,399,201 A | * | 4/1946 | Buckendale et al. ...... 74/665 R |
| 3,083,790 A | * | 4/1963 | McAfee et al. ............ 184/6.12 |
| 5,833,566 A | * | 11/1998 | Showalter .................... 475/198 |
| 5,853,342 A | * | 12/1998 | Pritchard et al. ........... 475/206 |
| 5,860,882 A | | 1/1999 | Petrilli et al. |
| 5,954,612 A | * | 9/1999 | Baxter, Jr. .................. 475/198 |
| 5,967,930 A | * | 10/1999 | Ahluwalia .................. 475/206 |
| 6,305,488 B1 | * | 10/2001 | Montineri .................... 180/374 |
| 6,675,677 B2 | * | 1/2004 | Thomas et al. ........ 74/665 GA |
| 2004/0118233 A1 | * | 6/2004 | Weilant ....................... 74/334 |
| 2004/0231444 A1 | * | 11/2004 | Leposky et al. .............. 74/424 |
| 2005/0211015 A1 | * | 9/2005 | Haka ............................ 74/640 |
| 2005/0215377 A1 | * | 9/2005 | Haka ............................ 475/210 |

* cited by examiner

*Primary Examiner*—David D. Le
(74) *Attorney, Agent, or Firm*—Harness, Dickey & Pierce, P.L.C.

(57) ABSTRACT

A transfer case for use in a motor vehicle to selectively transfer drive torque from a powertrain to first and second pairs of wheels. The transfer case includes an input shaft driven by the powertrain and an output shaft selectively driven by the input shaft. A transfer mechanism is operably disposed between the input shaft and the output shaft to transfer drive torque from the input shaft to the output shaft. The transfer mechanism includes a first chain that is selectively driven by the input shaft and a second chain that is driven by the first chain and that transfers drive torque to the output shaft.

18 Claims, 3 Drawing Sheets

TRANSFER CASE WITH DUAL CHAIN TRANSFER MECHANISM

FIELD OF THE INVENTION

The present invention relates to transfer cases and more particularly to a transfer case having a dual chain transfer mechanism.

BACKGROUND OF THE INVENTION

Traditionally, four-wheel drive (4WD) and all-wheel drive (AWD) vehicles enable transfer of drive torque, produced by an engine and supplied through a gear reducing transmission, to front and rear wheel assemblies. Depending upon the particular vehicle configuration, drive torque can be transferred to both the front and rear wheel assemblies on a full-time basis, part-time basis or "on-demand" basis. A vehicle using an "on-demand" system, normally operates in two-wheel drive (2WD) driving one of the front and rear wheel assemblies and selectively transfers drive torque to the other of the front and rear wheel assemblies in response to vehicle driving conditions.

A transfer case is generally provided for enabling the split of drive torque between the front and rear wheel assemblies. The transfer case includes an input, operably interconnected to an output of the transmission, a first output shaft and a second output shaft, respectively interconnected with the wheel assemblies. A transfer mechanism is provided therein for selectively engaging the first and second output shafts, enabling the transfer of drive torque therebetween. The transfer case must be conveniently packaged within a vehicle underbody, avoiding interference with other vehicle components including drive shafts, exhaust, suspension, vehicle frame and the like. Packaging of the transfer case within a vehicle underbody has become more difficult in recent years, as automakers seek to implement 4WD/AWD systems in smaller vehicle applications.

Traditional transfer mechanisms include first and second transfer gears interconnected by a transfer chain. The transfer gears are respectively interconnected with the first and second output shafts for rotation therewith. As the first output shaft is caused to rotate, thereby rotating the first transfer gear, the transfer chain transfers drive torque to the second output shaft through the second transfer gear.

Transfer mechanisms employing transfer chains retain significant disadvantages. A first disadvantage is the limited configurability. As mentioned above, a recent trend is to provide 4WD/AWD systems in increasingly smaller vehicle applications. Thus, underbody packaging plays an important role. Traditional transfer cases are sometimes difficult to properly package due to the limited configurability of the chain-type transfer mechanisms. A second disadvantage if noise, vibration and harshness (NVH) associated with chain-type transfer mechanisms.

In view of the above, it is desirable in the industry to provide an improved transfer case design. In particular, the improved transfer case design should alleviate the problems associated with traditional transfer cases employing chain-type transfer mechanism and should further enable design flexibility for resolving underbody packaging issues.

SUMMARY OF THE INVENTION

Accordingly, the present invention provides a transfer case for use in a motor vehicle to selectively transfer drive torque from a powertrain to first and second pairs of wheels.

The transfer case includes an input shaft driven by the powertrain and an output shaft selectively driven by the input shaft. A transfer mechanism is operably disposed between the input shaft and the output shaft to transfer drive torque from the input shaft to the output shaft. The transfer mechanism includes a first chain that is selectively driven by the input shaft and a second chain that is driven by the first chain and that transfers drive torque to the output shaft.

In other features, the transfer case further includes a clutch pack operably disposed between the input shaft and the transfer mechanism for selectively establishing a drive connection therebetween. The clutch pack includes a first casing fixed for rotation with the input shaft, a second casing in drive connection with the transfer mechanism, a first series of clutch plates fixed to the first casing and a second series of clutch plates intermeshed with the first series of clutch plates and fixed to the second casing. The first and second series of clutch plates are selectively engaged for establishing a drive connection between the first casing and the second casing.

In still other features, the transfer mechanism further includes a first sprocket rotatable about a first axis, second and third sprockets rotatable about a second axis and a fourth sprocket rotatable about a third axis. The first chain transfers drive torque between the first and second sprockets and the second chain transfers drive torque between the third and fourth sprockets. Any two of the first, second and third axes define a plane from which another of the first, second and third rotational axes is offset. The second and third sprockets have equivalent diameters. Alternatively, the second and third sprockets have different diameters.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
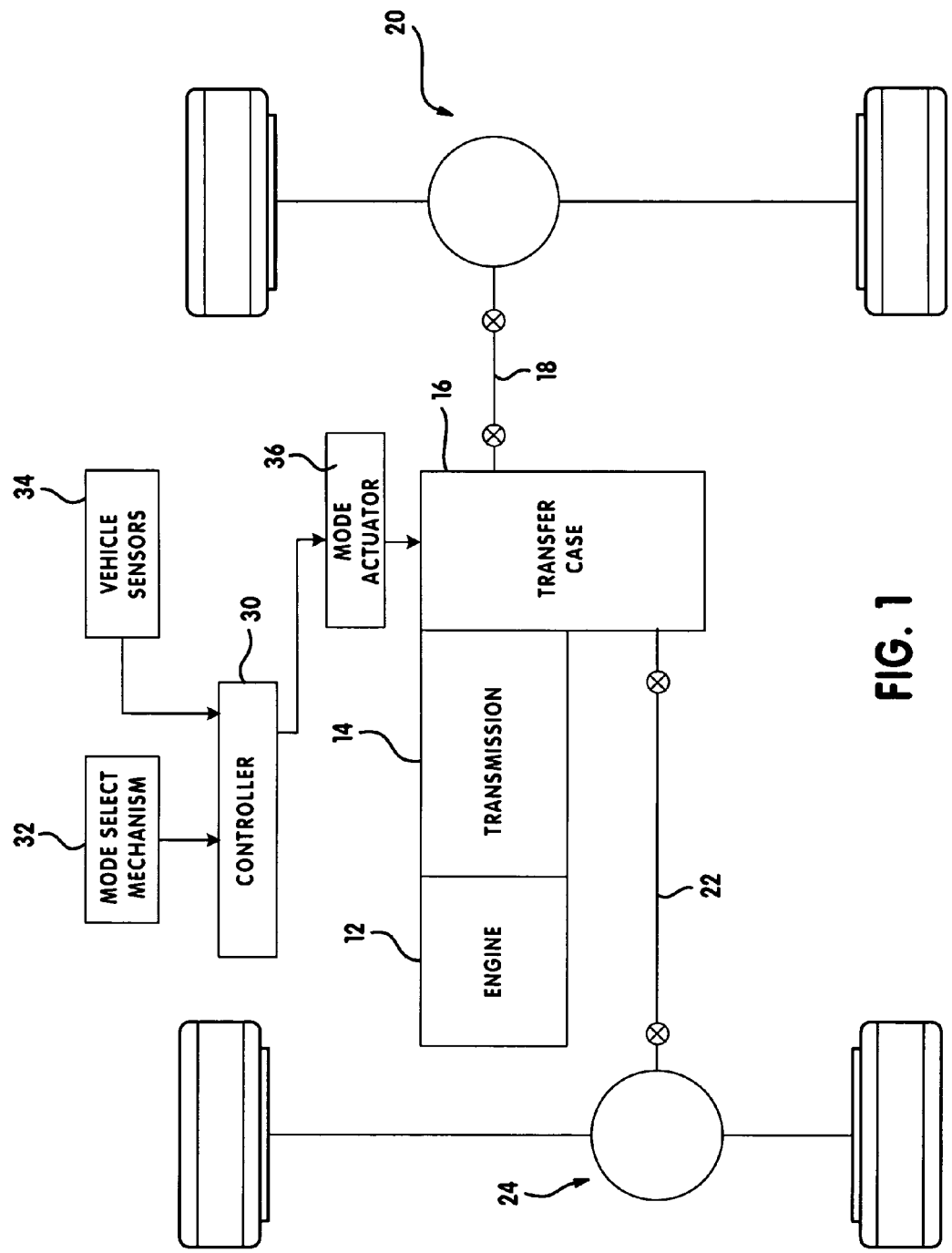
FIG. 1 is a schematic view of a vehicle driveline implementing a transfer case in accordance with the principles of the present invention.

With reference to FIG. 1, an exemplary vehicle driveline 10 is shown including an engine 12, a transmission 14, a transfer case 16, a rear drive shaft 18, a rear wheel assembly 20, a front drive shaft 22 and a front wheel assembly 24. The engine 12 is operably interconnected with the transmission 14, which is operably interconnected to the transfer case 16.

The engine 12 produces drive torque that is transferred to the transfer case 16 through selective gear ratios of the transmission 14. The transmission 14 is one of an automatic or manual type, as is known in the art. The transfer case 16 selectively splits the drive torque from the engine 12 for driving the front and rear wheel assemblies 24, 22.

A controller 30 is provided and is in communication with a mode select mechanism 32, a sensor group 34 and a mode actuator 36. The mode select mechanism 32 enables a vehicle operator to establish a desired driving mode. The different driving modes enable drive torque to be transferred to both the front and rear wheel assemblies on a full-time basis, part-time basis or "on-demand" basis. The controller 30 controls the mode actuator 36 based on input from the mode select mechanism. The sensor group 34 detects current driving conditions and relays that information to the controller 30. The controller 30 determines what action is required, in response to the driving conditions, and selectively engages the mode actuator 36 for appropriate manipulation of the transfer case 16. Control of the transfer case 16 is described in further detail hereinbelow.

Figure 2:
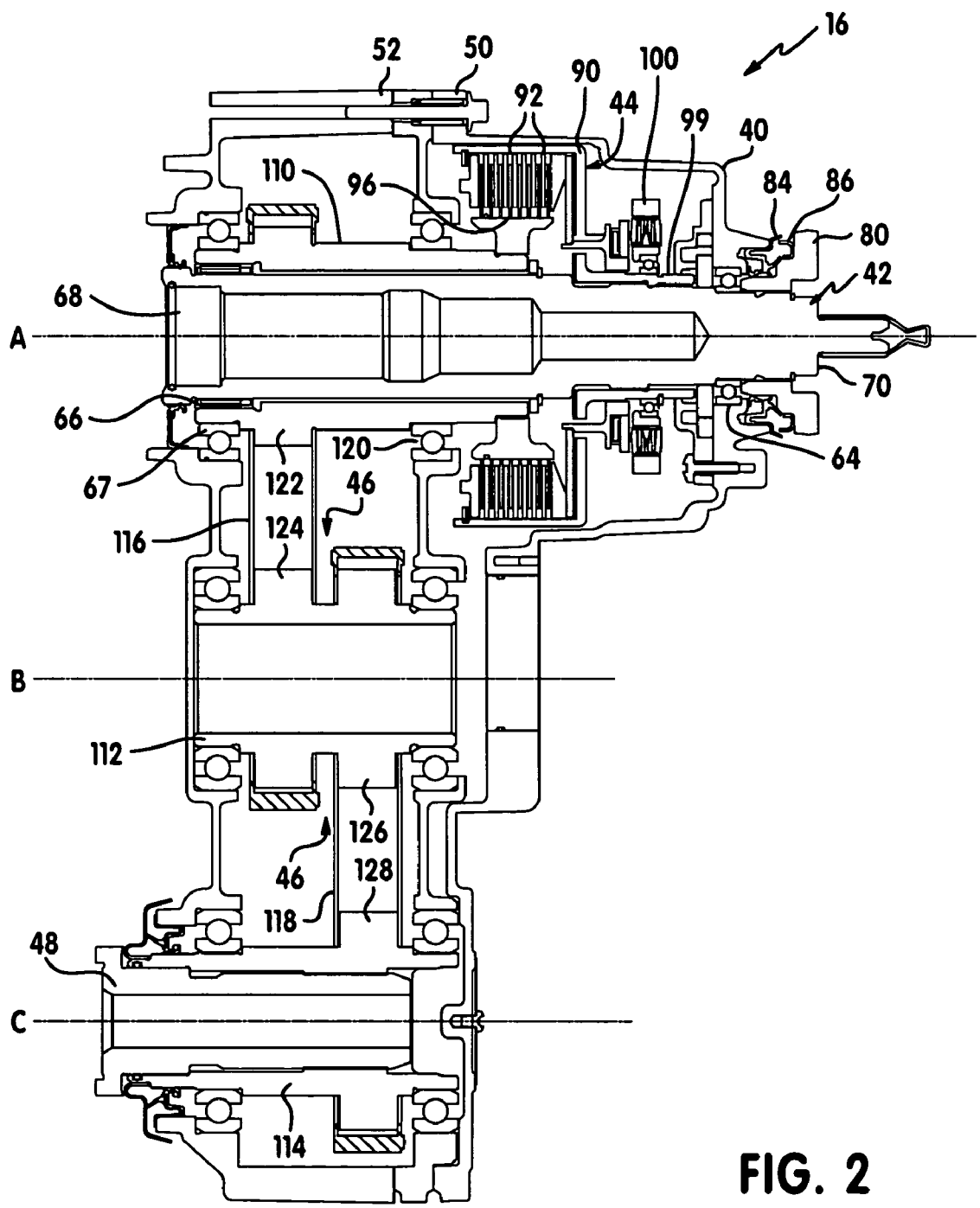
FIG. 2 is a cross-sectional view of an exemplary transfer case implementing a dual chain transfer mechanism according to the present invention.

With particular reference to FIG. 2, the transfer case 16 includes a housing 40, an input shaft 42, a clutch pack 44, a transfer mechanism 46 and an output shaft 48. The housing 40 includes first and second housing halves 50, 52 and supports the various components therein. The input shaft 42 selectively drives the transfer mechanism 46 to drive the output shaft 48. The clutch pack 44 is operably disposed between the input shaft 42 and the transfer mechanism 46 to selectively establish drive communication therebetween.

The input shaft 42 is rotatably supported within the housing 40 by bearings 64, 66, 67 and includes an input end 68 and an output end 70. The input end 68 engages an output (not shown) of the transmission 14. A flange 80 is rotatably coupled to the input shaft 42 and transfers drive torque to the rear drive shaft 18. A seal 84 and slinger (dust shield) 86 are provided about the flange 80, protecting the bearing 66 from dirt and debris.

The clutch pack 44 includes an outer case 90 having a series of inwardly extending clutch plates 92 attached thereto, an inner case 94 having a series of outwardly extending clutch plates 96 attached thereto, and an actuation mechanism 100. The outer case 90 is fixed for rotation with the input shaft 42 via a sleeve 99. The actuation mechanism 100 applies pressure to the intermeshed clutch plates 92,96 to vary torque transfer between the outer case 90 and the inner case 94. In a first or released mode, the clutch plates 96,92 slip relative to one another, thereby enabling the outer case 90 to rotate independently of the inner case 94 so that no rotary power or drive torque is transmitted from the outer case 90 to the inner case. In a second or intermediate mode, the engagement of the clutch plates 96,92 is controlled so as to permit the clutch plates 96 to slip relative to the clutch plates 92 to thereby limit the torque that is transmitted between the outer case 90 and the inner case 94. In the second mode, a variable amount of torque is transferred from the outer case 90 to the inner case 94, depending on the manner in which the actuation mechanism 100 controls the slip and engagement of the clutch plates 92, 96. In a third or locked mode, the clutch plates 96, 92 are fully engage so as to lock together, thereby fixing the outer case 90 with the inner case 94 to transfer full torque therebetween.

The transfer mechanism 46 includes an input sleeve 110, an intermediate shaft 112, an output sleeve 114 and first and second chains 116, 118. The first chain 116 transfers drive torque from the input sleeve 110 to the intermediate shaft 112. The second chain 118 transfers drive torque from the intermediate shaft 112 to the output sleeve 114. The input sleeve 110 rotates about an axis A and is rotatably supported on the input shaft 42 by bearings 68 and bearing 120. The input sleeve 110 is fixed for rotation with the inner case 94 of the clutch pack 44. In this manner, manipulation of the clutch pack 44 selectively couples the input sleeve 110 to be driven by the input shaft 42. A sprocket 122 is formed on the input sleeve 110 and engages the first chain 116 to drive the first chain 116.

The intermediate shaft 112 rotates about an axis B and includes sprockets 124, 126. The sprocket 124 engages the first chain 116 so that the first chain 116 drives the intermediate shaft 112. The sprocket 126 engages the second chain 118 to drive the second chain 118. The output sleeve 114 is rotatably driven about an axis C by the second chain 118. The output sleeve 114 is fixed for rotation with the output shaft 48 and includes a sprocket 128 formed thereon. The sprocket 128 engages the second chain 118 to transfer drive torque to the output shaft 48. Although the output sleeve 114 is implemented in the illustrated embodiment, it is anticipated that the sprocket 128 can be directly attached to or integrally formed as a part of the output shaft 48.

With the clutch pack 44 operating in one of the second and third modes, drive torque is transferred from the input shaft 42, through the clutch pack 44 and to the input sleeve 110. The drive torque is further transferred from the input sleeve 110 to the first chain 116 through the sprocket 122. The drive torque is transferred from the first chain 116 to the sprocket 124, to the intermediate shaft 112 and through the sprocket 126 to the second chain 118. Although the sprockets 124, 126 are illustrated to have an equivalent diameter, it is further anticipated that the sprocket 124 can have a different diameter than the sprocket 126. In this manner, torque transfer from the first chain 116 to the second chain 118 can be achieved at a predefined gear ratio to achieve torque multiplication or reduction. From the second chain 118, the drive torque is transferred through the sprocket 128, the output sleeve 114 and the output shaft 48 to the front drive shaft 22.

Figure 3:
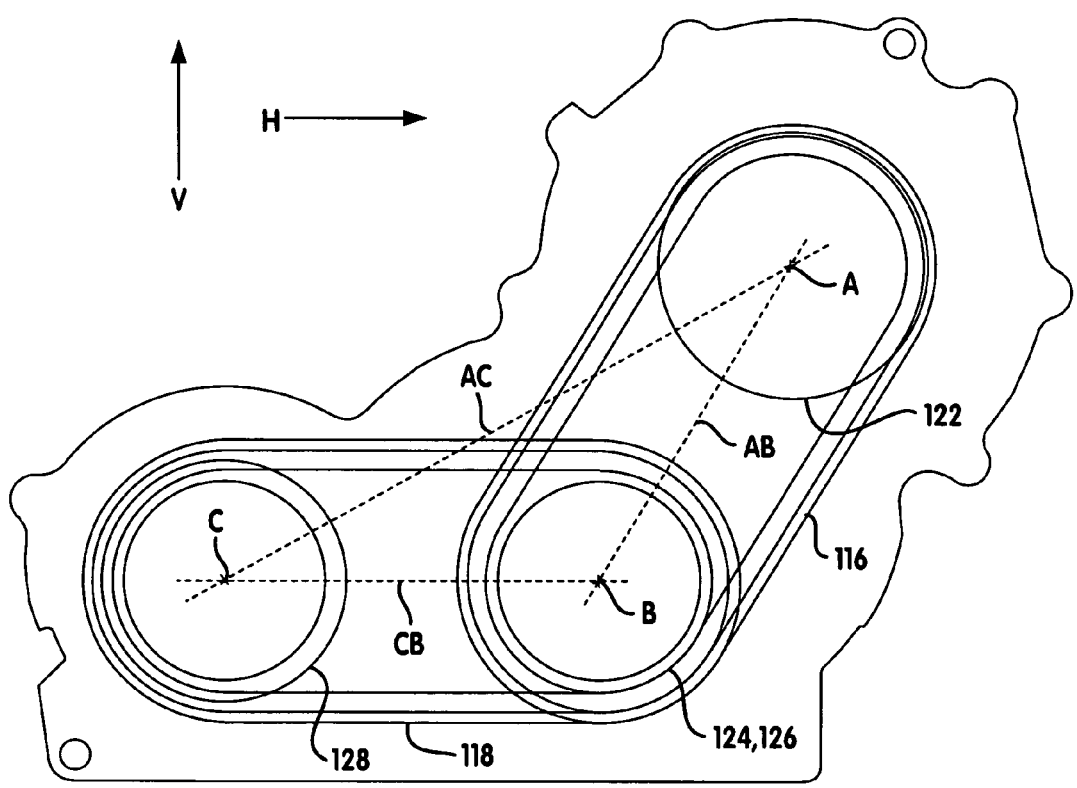
FIG. 3 is a schematic side view of the transfer case of FIG. 2 illustrating relative axial positions of an input shaft, an output shaft and an intermediate shaft according to the present invention.

With reference to FIG. 3, relative alignment of the rotational axes A, B, and C will be described in detail. As shown, any two of the rotational axis may form a plane (AB, AC, CB), from which the remaining rotational axis is offset. In this manner, an boomerang shaped cross-section is provided, enabling the transfer case 16 to be packaged around other underbody components of the vehicle. Variation in the relative positions of the axis along a horizontal axis (H) and/or a vertical axis (V) enables a variation in the cross-section to provide alternative packaging options. Although the present embodiment only provides a plane being defined between two rotational axis, it will be appreciated that the rotational axis may be so aligned, whereby two or more rotational axis define a plane. The variation in transfer case configuration enables underbody packaging advantages over prior art transfer cases.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A single offset transfer case adapted for connecting a transmission output shaft to front and rear drivelines of a motor vehicle, the single offset transfer case comprising:

a housing having a first side and a second side opposite the first side;

a shaft member having an input portion, a first output portion and a second output portion, the input portion being adapted to be coupled to the transmission output shaft, the first output portion being adapted to be coupled to the rear drive line and outputting rotary power through the second side of the housing to drive the rear driveline, the second output portion being disposed between the input portion and the first output portion, the second output portion providing a rotary output that is distinct from the rotary power output by the first output portion, the rotary output from the second output portion being adapted to drive the front driveline;

a first bearing set supporting the shaft member for rotation about a first rotational axis, the first bearing set having a first bearing and a second bearing, the first bearing being coupled to the first side of the housing and supporting the input portion, the second bearing being coupled to the second side of the housing and supporting the first output portion;

an output shaft that is disposed in the housing and rotatable about a second rotational axis, the output shaft being adapted to be coupled to the front driveline, the second rotational axis being disposed in a first common plane with the first rotational axis;

a torque clutch having a first portion and a second portion, the first portion being coupled for rotation with the second output portion of the shaft member, the second portion being supported for rotation about the shaft member;

an intermediate shaft rotatably disposed in the housing along a third rotational axis that is located between the first rotational axis and the second rotational axis, the third rotational axis being disposed in a second common plane with the first rotational axis, the third rotational axis being disposed in a third common plane with the second rotational axis, each of the first, second and third common planes being different from one another;

a first chain that transmits rotary power from the second portion of the clutch to the intermediate shaft; and a second chain that transmits rotary power from the intermediate shaft to the output shaft.

2. The single offset transfer case of claim 1, wherein the first chain transmits rotary power from the second portion of the clutch to the intermediate shaft at a first ratio and the second chain transmits rotary power from the intermediate shaft to the output shaft at a second ratio that is about equal to the first ratio.

3. The single offset transfer case of claim 1, wherein the first chain transmits rotary power from the second portion of the clutch to the intermediate shaft at a first ratio and the second chain transmits rotary power from the intermediate shaft to the output shaft at a second ratio, the second ratio being different from the first ratio.

4. The single offset transfer case of claim 1, wherein the torque clutch further includes a plurality of first clutch plates and a plurality of second clutch plates, the first clutch plates being fixedly coupled to the first portion of the clutch, the second clutch plates being intermeshed with the first clutch plates and fixed to the second portion of the clutch, and wherein engagement of the first and second clutch plates facilitates transmission of rotary power between the first and second portions.

5. The single offset transfer case of claim 1, wherein the torque clutch is operable in a released mode, wherein the first and second portions of the torque clutch rotate independently from one another so as to inhibit torque transmission therebetween, and a locked mode, wherein the second portion is coupled for rotation with the first portion.

6. The single offset transfer case of claim 5, wherein the torque clutch is further operable in an intermediate mode wherein coupling of the first portion to the second portion can be controlled to distribute rotary power between the first and second portions in a desired manner.

7. A single offset transfer case adapted for connecting a transmission output shaft to front and rear drivelines of a motor vehicle, the transfer case comprising:

a housing having a first side and a second side opposite the first side;

a shaft member having an input portion, a first output portion and a second output portion, the first output portion including an output coupling portion that is adapted to transmit rotary power through the second side of the housing to one of the front and rear drivelines, the second output portion being disposed between the input portion and the first output portion, the second output portion providing a rotary output that is distinct from the rotary power output from the first output portion, the rotary output from the second output portion being adapted to drive the other one of the front and rear drivelines;

a first bearing set supporting the shaft member for rotation about a first rotational axis, the first bearing set having a first bearing and a second bearing, the first bearing being coupled to the first side of the housing and supporting the input portion, the second bearing being coupled to the second side of the housing and supporting the first output portion; an output shaft that is disposed in the housing and rotatable about a second rotational axis, the second rotational axis being disposed in a first common plane with the first rotational axis;

a clutch having a first portion and a second portion, the first portion being coupled for rotation with the second output portion of the shaft member, the second portion being supported for rotation about the shaft member;

an intermediate shaft rotatably disposed in the housing along a third rotational axis that is located between the first rotational axis and the second rotational axis, the third rotational axis being disposed in a second common plane with the first rotational axis, the third rotational axis being disposed in a third common plane with the second rotational axis, each of the first, second and third common planes being different from one another;

a first chain that transmits rotary power from the second portion of the clutch to the intermediate shaft; and a second chain that transmits rotary power from the intermediate shaft to the output shaft.

8. The single offset transfer case of claim 7, wherein the clutch further includes a plurality of first clutch plates and a plurality of second clutch plates, the first clutch plates being fixedly coupled to the first portion of the clutch, the second clutch plates being intermeshed with the first clutch plates and fixed to the second portion of the clutch, the first and second clutch plates being partially engaged to one another when the clutch is operated in the intermediate mode for establishing a drive connection between the first and second portions of the clutch.

9. The single offset transfer case of claim 7, wherein torque is transmitted via the first chain at a first ratio, wherein torque is transmitted through the second chain at a second ratio, and wherein the first ratio is equal to the second ratio.

10. The single offset transfer case of claim 7, wherein torque is transmitted via the first chain at a first ratio, wherein torque is transmitted through the second chain at a second ratio that is different from the first ratio.

11. The single offset transfer case of claim 7, wherein the clutch is selectively operable in at least one of a released mode in which the first and second portions of the clutch are disengaged from one another such that the first and second portions can rotate independently of one another, and a locked mode in which the first and second portions of the clutch are engaged to one another such that they co-rotate.

12. The single offset transfer case of claim 11, wherein the clutch is also selectively operable in an intermediate mode wherein engagement of the first and second portions of the clutch can be controlled to vary torque transmission between the first and second portions.

13. A single offset transfer case adapted for connecting a transmission output shaft to front and rear drivelines of a motor vehicle, the single offset transfer case comprising:
   a housing having a first side and a second side that is opposite the first side;
   a shaft structure disposed in the housing, the shaft structure including an input portion, which extends from the first side of the housing, a first output portion, which extends from the second side of the housing, and a second output portion, which is disposed between the input portion and the first output portion, the shaft structure being rotatable about a first rotational axis, the first output portion being adapted to provide a first rotary output for driving one of the first and second drivelines, the second output portion being adapted to provide a second rotary output that is distinct from the first rotary output, the rotary output of the second output portion being adapted to drive the other one of the first and second drivelines;
   an output shaft that is disposed in the housing and rotatable about a second rotational axis, the second rotational axis being disposed in a first common plane with the first rotational axis;
   a clutch having a first portion and a second portion, the first portion being coupled for rotation with the second portion of the shaft structure, the second portion being supported for rotation about the shaft structure;
   a first sprocket coupled for rotation with the second portion of the clutch;
   an intermediate shaft assembly having a intermediate shaft, a second sprocket and a third sprocket, the intermediate shaft being disposed in the housing along a third rotational axis that is located between the first rotational axis and the second rotational axis, the second and third sprockets being coupled for rotation about the third rotational axis, the third rotational axis being disposed in a second common plane with the first rotational axis, the third rotational axis being disposed in a third common plane with the second rotational axis, each of the first, second and third common planes being different from one another;
   a fourth sprocket coupled for rotation with the output shaft;
   a first chain that is coupled to the first and second sprockets for transmitting torque between the first and second sprockets; and
   a second chain that is coupled to the third and fourth sprockets for transmitting toque between the third and fourth sprockets;
   wherein the clutch is selectively operable in a released mode, a locked mode and an intermediate mode, wherein the first and second portions of the clutch are disengaged from one another in the released mode such that the first and second portions can rotate independently of one another, wherein the first and second portions of the clutch are engaged to one another in the locked mode such that they co-rotate, and wherein engagement of the first and second portions of the clutch can be controlled to vary torque transmission between the first and second portions when the clutch is operated in the intermediate mode.

14. The single offset transfer case of claim 13, wherein the clutch further includes a plurality of first clutch plates and a plurality of second clutch plates, the first clutch plates being fixedly coupled to the first portion of the clutch, the second clutch plates being intermeshed with the first clutch plates and fixed to the second portion of the clutch, the first and second clutch plates engaging one another to transmit torque between the first and second portions.

15. The single offset transfer case of claim 13, wherein torque is transmitted via the first chain at a first ratio, wherein torque is transmitted through the second chain at a second ratio, and wherein the first ratio is equal to the second ratio.

16. The single offset transfer case of claim 13, wherein torque is transmitted via the first chain at a first ratio, wherein torque is transmitted through the second chain at a second ratio that is different from the first ratio.

17. The single offset transfer case of claim 13, wherein the second and third sprockets are fixedly coupled to the intermediate shaft.

18. The single offset transfer case of claim 13, wherein the intermediate shaft is rotatable about the third rotational axis.

* * * * *